United States Patent [19]

Hiramatsu et al.

[11] 4,306,729

[45] Dec. 22, 1981

[54] SEALING MATERIAL

[75] Inventors: Fumio Hiramatsu, Fujisawa; Kenichi Ohsone, Ninomiya; Tatsuaki Yukimasa, Chigasaki, all of Japan

[73] Assignee: Nippon Oil Seal Industry Co., Ltd., Tokyo, Japan

[21] Appl. No.: 79,113

[22] Filed: Sep. 26, 1979

[51] Int. Cl.³ .......................... F16J 15/32; B05D 3/12
[52] U.S. Cl. .......................... 277/153; 277/1; 277/227; 277/DIG. 6; 427/290
[58] Field of Search .......... 277/DIG. 6, 227, DIG. 4, 277/DIG. 1, 152, 153; 427/290

[56] References Cited

U.S. PATENT DOCUMENTS

| | | | |
|---|---|---|---|
| 2,172,325 | 9/1939 | Victor et al. | 277/227 X |
| 2,538,198 | 1/1951 | Hosford | 277/227 X |
| 3,097,990 | 7/1963 | Holly et al. | 277/DIG. 6 |
| 3,223,676 | 12/1965 | Rucker | 277/DIG. 6 |
| 3,228,786 | 1/1966 | Fitzgerald et al. | 427/290 |
| 3,660,184 | 5/1972 | Burelle et al. | 277/227 X |
| 3,671,048 | 6/1972 | Gyory et al. | 277/227 |

FOREIGN PATENT DOCUMENTS

| | | | |
|---|---|---|---|
| 167979 | 7/1956 | Australia | 277/227 |
| 54-12440 | 9/1979 | Japan | 277/DIG. 6 |
| 459544 | 1/1937 | United Kingdom | 277/227 |
| 1262789 | 2/1972 | United Kingdom | 277/227 |

*Primary Examiner*—Robert S. Ward, Jr.
*Attorney, Agent, or Firm*—Holman & Stern

[57] ABSTRACT

There is provided a sealing material comprising 100 parts by weight of a fibrous material made of polyester, polyamide or the like which constitutes a non-woven cloth; and 10 to 150 parts by weight, based on the weight after dried and hardened, of one or a mixture of a styrene-butadiene polymer base latex, an acrylonitrile-butadiene polymer base latex, an acrylic ester polymer base latex, a polysiloxane base latex and/or a fluorine-contained rubber base latex impregnated in the fibrous material.

7 Claims, 2 Drawing Figures

SEALING MATERIAL

BRIEF SUMMARY OF THE INVENTION

The present invention relates to a sealing material, and more particularly it relates to a sealing material made of a non-woven cloth impregnated with a latex.

DESCRIPTION OF THE PRIOR ART

There has been conventionally known a structure provided with a dust lip 2 for preventing dust from entering into the cavity between a rotary shaft and a surrounding housing, and this dust lip 2 extends from a base portion 5 of a main lip 4 of a rubber oil seal 3 obliquely to and externally of the axial direction (toward the left-hand side in the drawing) toward the outer circumferential face of a shaft 6 and contacting with the circumferential face, as shown in FIG. 1, and is made of the same rubber as that of the main lip 4. However, with such a dust lip made of a rubber material, if the contact load applied on the shaft is increased by increasing the lip interference to the shaft 6, the fluid existing in an annular cavity 7 formed by the main lip 4, the dust lip 2 and the shaft 6 is forcibly discharged from the cavity 7 due to the fluid suction force drawing the fluid into the portion internally of the main lip 4 (in the right-hand direction as viewed in the drawing) caused by the rotational movement of the shaft 6 and the action of the main lip 4, whereby the pressure in the annular cavity 7 is reduced. As a result, both lips are urged against the circumferential faces of the shaft 6 too strongly and thereby cause heating and abnormal wear of the lips. For this reason, it is inevitible to reduce the interference between the dust lip 2 and the shaft 6 such that some amounts of gas can creep between the outer end of the dust lip 2 and the shaft into the annular cavity 7. However, such construction is disadvantageous in that dusts enter into the annular cavity 7 with the gas creeping through the lips.

Further known to the art is a structure, as shown in FIG. 2, wherein a dust lip 2' made of a commonly used felt is provided in place of the rubber dust lip 2 shown in FIG. 1. When using such dust lip made of a felt, a reduced pressure is not developed in the annular cavity 7, which is different from the prior art structure shown in FIG. 1, since the felt material is permeable in itself. However, if the lip interference to the shaft 6 is increased, fibers constituting the felt have fallen out from the portion contacting with the periphery of the shaft to thereby reduce the lip interference in a short period of time and permit dust to enter from the outside into the annular cavity 7. A further disadvantage is that the fibers fallen out from the felt are pulled onto the sealingly sliding face beneath the main lip 4 to adversely affect the sealing function of the main lip 4. In order to overcome these disadvantages, in the seal of this kind, the thickness of the felt constituting the dust lip 2' is increased and the lip interference to the shaft 6 is decreased to increase the contact width of the shaft 6 with the fore end of the dust lip 2', thereby to prevent the dusts from entering into the cavity mainly by making use of the labyrinth effect. However, the entering of the dust cannot be satisfactorily prevented at the present time, since the lip interference to the shaft 6 is small.

An object of the present invention is to provide a sealing material which produces a stable sealing function.

Another object of the present invention is to provide a sealing material comprising a non-woven cloth impregnated with a determined amount of a latex which is hardened without deteriorating the permeability inherent in the non-woven cloth, from which sealing material a seal capable of performing a stable sealing effect for a prolonged period of time may be produced.

DETAILED DESCRIPTION OF THE PREFERRED EMBODIMENTS

Figure 1:
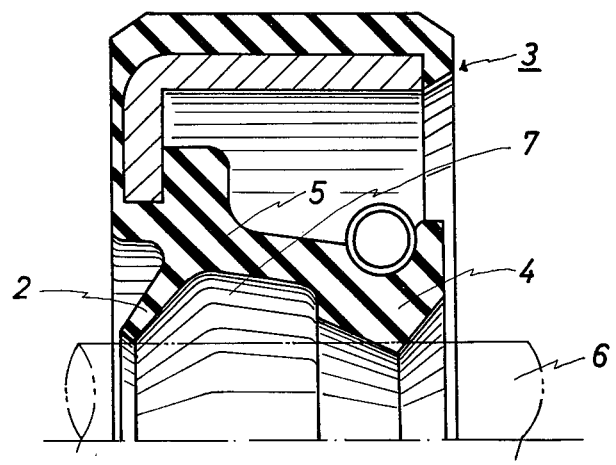
FIG. 1 is a longitudinal cross section of an oil seal of the prior art provided with a dust lip made of a material other than non-woven cloth.

The fibrous material for the non-woven cloth used in the present invention may be selected from cellulose base fibers, polyamide base fibers, polyester base fibers, acrylic synthetic fibers and heat resistant polyamide fibers as desired, and the polyester base fibers and the polyamide base fibers are preferred in view of their processabilities, heat resistant properties and wear resistant properties.

In cases where a particularly high heat resistance is required, a fibrous material of heat resistant polyamide is used.

As to the latex used in the present invention, styrene-butadiene polymer base latex, acrylonitrile-butadiene polymer base latex, acrylic ester polymer base latex, silicone base latex, fluorine contained rubber base latex, urethane rubber base latex, chloroprene rubber base latex and natural rubber base latex may be selectively used, and the particularly preferred latexes are styrene-butadiene polymer base latex, acrylonitrile-butadiene polymer base latex, acrylic ester polymer base latex, silicone rubber base latex and fluorine contained rubber base latex. A mixture of two or more of the latexes mentioned above may be used, for example a mixture composed of a styrene-butadiene polymer base latex and an acrylonitrile-butadiene polymer base latex may be effectively used to attain the object of the invention.

It should be apparent from the object of the invention that each of the aforementioned latexes shall have the rubber-like elasticity after dried and hardened.

The amount of a latex impregnated in a non-woven cloth ranges such that 100 parts by weight of the fibrous material constituting the non-woven cloth be combined with 10 to 150, preferably 50 to 120, parts by weight of the latex weighed after dried and hardened. If the amount of the latex exceeds 150 parts by weight, the permeability of the non-woven cloth is impaired. If the amount of the latex is short of 10 parts by weight, the adhesion between the fibers of the non-woven cloth becomes unsatisfactory and results in poor "anti-falling off property" causing the fibers of the non-woven cloth to fall off from the cloth. In general, it is desired that the permeability of the non-woven cloth impregnated with the latex, after the latex is dried and hardened, be more than 5 $cc/cm^2 \cdot sec$.

In consideration of the permeability, the thickness of the non-woven cloth used in the present invention is preferably about 0.3 to 3 mm, and the weight thereof after being impregnated with the latex which is then dried and hardened is 100 to 500 $g/m^2$, preferably 150 to 300 $g/m^2$.

If the non-woven cloth of less than 0.3 mm in thickness and less than 100 g/m² in weight is used, the durability is badly affected. On the contrary, if the non-woven cloth of more than 3 mm in thickness and more than 500 g/m² in weight is used, the "dust-proof property" is badly affected.

Meanwhile, the terminology "anti-falling off property" used throughout the specification means that the fibers constituting the non-woven cloth resist against falling off from the non-woven cloth, and the terminology "dust-proof property" means the property of preventing the entering of the dusts.

Further, in order to be adapted for the intended use, the sealing material of the present invention shall be provided with a contact load and elasticity of some extent, and in this connection it is desired that the tensile strength be more than 5 kg per 25 mm width and the elongation thereof be more than 10%.

On the other hand, since the non-woven cloth is produced, in general, by the steps of untangling the fibers and then making multi-plied fibrous materials, there is a risk that the plies are subject to peeling at the interface between the plies. In order to obviate this phenomenon, an important feature of the present invention resides in that the non-woven cloth used in the invention is prevented from the interfacial peeling by needle punching. It is desired that the peeling strength at the interface between the plies of the non-woven cloth used in the invention be more than 0.2 kg, preferably more than 0.5 kg, per 25 mm width of the non-woven cloth.

Figure 2:
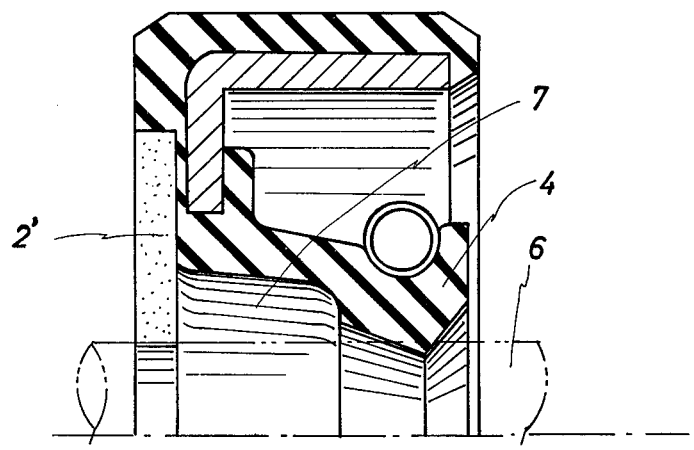
FIG. 2 is a longitudinal cross section of an oil seal provided with a dust lip made of a non-woven cloth.

When a dust lip as shown in FIG. 2 is produced using the sealing material comprising a non-woven cloth impregnated with a proper amount of a latex according to the present invention as mentioned above, the risk of developing a reduced pressure in the annular cavity 7, as is the case of the conventional structure shown in FIG. 1, to cause both of the lips to press on the circumferential face of the shaft 6 too strongly resulting in heating and abnormal wear of the lips, can be effectively avoided since the dust lip per se has a proper permeability. Moreover, since the sealing material according to the present invention is made of a non-woven cloth the fibers of which are intimately adhered to each other by the impregnated latex, a problem of the conventional sealing material from which fibers fall off to reduce the sealing function of the main lip 4 may be effectively eliminated.

Furthermore, the sealing material according to the present invention comprises a non-woven cloth impregnated with a determined amount of a latex, and thus may be used effectively at the portion subjected to frictional sliding action since the wear resistance thereof is excellent.

The examples of the invention will now be described.

Examples 1 to 5 and Comparative Examples 1 and 2

Using non-woven cloths of polyester fibers, an acrylonitrile-butadiene copolymer base latex was impregnated in each of the cloths while changing the amount of the latex to be impregnated as shown in Table 1. The "latex weight" illustrated in Table 1 means the part by weight of the latex contained in 100 parts by weight of the fibrous material constituting the non-woven cloth weighed after impregnating the latex in the non-woven cloth and then heating to dry at 120° C. for about 20 minutes.

The non-woven cloth was impregnated with the latex in such manner that the latex was diluted to have the latex content of 15% into which the non-woven cloth was dipped under the atmospheric pressure.

The anti-falling off property and the dust-proof property of each of the examples and comparative examples shown in Table 1 were determined in accordance with the following procedures.

Firstly, oil seals were provided with a dust lip of non-woven cloth impregnated and not impregnated with latex, whose shapes were the same and as shown in FIG. 2, were molded, each of which was mounted on a rotatable shaft. The portion internally of the right-hand side of the main lip 4 was filled with the engine oil SAE #30 while allowing the left-hand side of the dust lip 2' to face the atmosphere. The shaft was rotated at a circumferential speed of 15.8 m/sec (3,000 rpm) for 20 hours and then stopped. The anti-falling off property was judged by visually observing the wear of the dust lip and the chips falling off from the dust lip 2' and being present between the main lip 4 and the dust lip 2'.

The dust-proof property was judged as follows. The seals were tested under the similar test conditions at which the aforementioned anti-falling off property test was conducted except that the dust, JIS #8 (fine Kanto loamy mud defined by Japanese Industrial Standard Z8901) was suspended in the atmospheric environment at a content of 3.2 vol.%. After rotating the shaft at a circumferential speed of 15.8 m/sec (3,000 rpm) for 100 hours, the amount of the dust entering into the inside of the main lip 4 was visually observed to judge the dust-proof property.

As will be apparent from the test results set forth in Table 1, if the amount of the impregnated latex is small the anti-falling off property becomes poor, and on the contrary if the amount of the latex is too large the permeability of the dust lip is impaired to cause abnormal wear of the main lip 4 and dust lip 2' leading to reduction in the dust-proof property.

Examples 6 to 13

Using the same non-woven cloth as used in Examples 1 to 5, different latexes were impregnated to produce the sealing materials which were tested. The results are shown in Table 2. Throughout these examples, 100 parts by weight of the fibrous material of the non-woven cloth was impregnated with 100 parts by weight of each of the latexes based on the dried and hardened weight.

TABLE 1

|  | Latex Weight | Anti-falling off Property | Dust-proof Property |
| --- | --- | --- | --- |
| Comparative Example 1 | 0 part by weight | bad | bad |
| Example 1 | 10 parts by weight | medial | medial |
| Example 2 | 30 parts by weight | medial | medial |
| Example 3 | 50 parts by weight | good | good |
| Example 4 | 100 parts by weight | good | good |
| Example 5 | 150 parts by weight | good | good |
| Comparative Example 2 | 200 parts by weight | good | bad |

TABLE 2

|  | Latex Used | Anti-falling off property | Peeling strength (g/2.5cm W) |
|---|---|---|---|
| Example 6 | Styrene-butadiene polymer base latex | good | 500 |
| Example 7 | Acrylonitrile-butadiene polymer base latex | good | 1800 |
| Example 8 | Ethyl acrylate ester polymer base latex | good | 1800 |
| Example 9 | Silicone rubber base latex | good | 1700 |
| Example 10 | Fluorine-contained rubber base latex | good | 1900 |
| Example 11 | Chloroprene rubber base latex | good | 1800 |
| Example 12 | Natural rubber base latex | good | 400 |
| Example 13 | Urethane rubber base latex | medial | 1000 |

What is claimed is:

1. A sealing material for a dust lip extending from a base portion of a main lip of a rubber oil seal comprising a non-woven cloth impregnated with a latex, wherein 100 parts by weight of a fibrous material constituting said non-woven cloth is impregnated with 10 to 150 parts by weight of said latex when weighed after dried and hardened, said material having a permeability of more than 5 cc per $cm^2.Sec$.

2. A sealing material according to claim 1, wherein said fibrous material constituting said non-woven cloth is a polyester.

3. A sealing material according to claim 1, wherein said latex is one selected from the group comprising a styrene-butadiene polymer base latex, an acrylonitrile-butadiene polymer base latex, an acrylic ester polymer base latex, a silicone rubber base latex and a fluorine-contained rubber base latex.

4. A sealant material according to claim 1, wherein the thickness of said non-woven cloth ranges from 0.3 to 3 mm.

5. A sealing material according to claim 1, wherein said non-woven cloth is punched by a needle punch to prevent peeling at the interface between the plies.

6. A sealing material according to claim 1, wherein said fibrous material constituting said non-woven cloth is a polyamide.

7. A sealing material according to claim 1, wherein said latex is a mixture of at least two latexes selected from a styrene-butadiene polymer base latex, an acrylonitrile-butadiene polymer base latex, an acrylic ester polymer base latex, a silicone rubber base latex and a fluorine-contained rubber base latex.

* * * * *